Jan. 14, 1969 W. A. REICH 3,421,196
CUTTING TOOL INSERT
Filed Sept. 12, 1966

INVENTOR
William A. Reich
BY Harold J. Holt
ATTORNEY

United States Patent Office 3,421,196
Patented Jan. 14, 1969

3,421,196
CUTTING TOOL INSERT
William A. Reich, Huntington Woods, Mich., assignor to General Electric Company, a corporation of New York
Filed Sept. 12, 1966, Ser. No. 578,646
U.S. Cl. 29—95     3 Claims
Int. Cl. B26d 1/00

ABSTRACT OF THE DISCLOSURE

A disposable insert for a cutting tool in the form of a generally rectangular block having at least four sharply angled parallel cutting edges, at least one, but not all, of the cutting edges being chamfered to form a relatively blunt cutting edge. This makes possible the use of a single indexable and disposable insert for the machining of workpieces having both a relatively smooth and an interrupted surface.

---

This invention relates to disposable inserts for cutting tools and more particularly to an improved multiple edged cemented carbide indexable insert for cutting tools.

Disposable cemented carbide cutting tool inserts are well known in the art. They are generally manufactured as regular polygons or cylinders with all of the cutting edges formed to the same sharp angle, i.e. the angle between the two edge surfaces forming the cutting edge, so that upon one edge becoming worn, the insert can be rapidly indexed or inverted to present a fresh cutting edge of the same geometry as that of the worn edge prior to the wear. It often occurs in machining operations, and particularly heavy machining, that stock removal during a portion of the machining is from a relatively smooth surface of the workpiece, while during other portions of the operation stock removal is from workpiece portions with interrupted surfaces, i.e. surfaces which have recesses or are otherwise relatively irregular or uneven.

Figure 1:
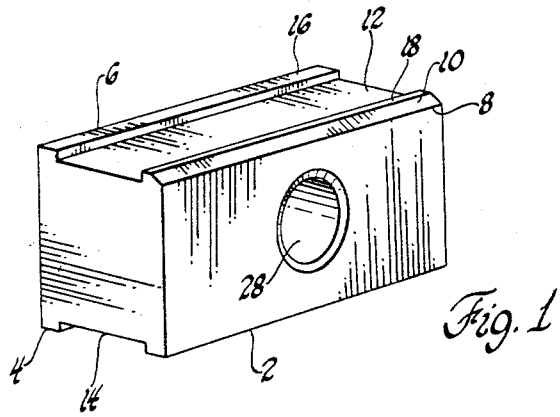
Figure 2:
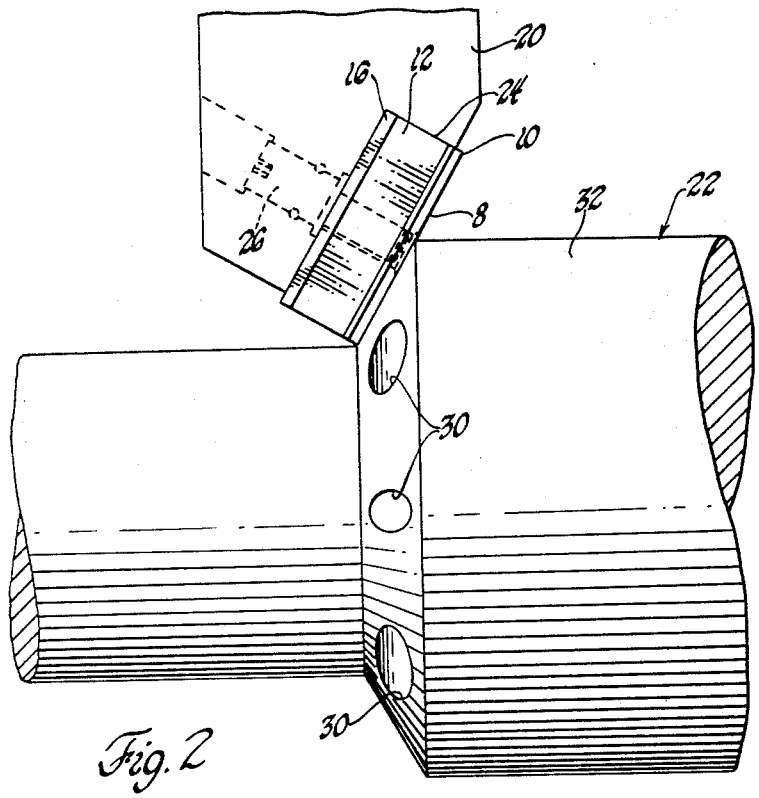

It is the principal object of the present invention to provide an improved disposable insert which can be indexed or inverted to present cutting edges of different geometry so that during any cutting operation, or portion of a cutting operation, the optimum shape of cutting edge for maximum efficiency and minimum insert damage can be conveniently provided by a single insert. Indexable inserts made in accordance with the present invention enable rapid transition from a cutting edge of one geometry to a cutting edge of another geometry for removing stock from the different portions of the workpiece so that for each portion there is optimum cutting efficiency commensurate with minimum hazard of cutting edge damage. These and other objects, features and advantages of the invention will appear more clearly from the following detailed description made in part with reference to the accompanying drawings in which:

FIGURE 1 shows an indexable and invertible cutting insert made in accordance with the preferred embodiment of the invention; and FIGURE 2 shows a plan view of the insert of FIG. 1 mounted in a cutting tool and performing a cutting operation.

Referring to the drawing, the insert shown is formed of dense cemented carbide, specifically cemented tungsten carbide, and has four cutting edges—2, 4, 6 and 8. Cutting edges 2 and 4 are formed by the intersection of the bottom and side surfaces of the insert, and edges 6 and 8 are formed by the intersection of the top and side surfaces of the insert. Three of these cutting edges—2, 4 and 6—are of identical shape, and the fourth cutting edge, that shown at 8, is different by way of a heavy chamfer 10.

In this preferred embodiment of the invention, recesses 12 in the top surface and 14 in the bottom surface of the insert are provided whereby the surface portions, such as shown at 16 and 18, which are adjacent to the cutting edges, are raised above the surface of the recessed center portion 12 of the insert. This type of insert is especially desirable for heavy-duty cutting operations wherein the chip thickness of the stock removed is upwards of 0.030 inch; however, by reason of the heavy stock removal and by reason of such cutting edge configuration to accomplish optimum cutting efficiency, the cutting edges as shown at 2, 4 and 6 are susceptible to shock damage during stock removal from a workpiece with an interrupted surface.

To avoid such damage, the insert made in accordance with the present invention can be quickly indexed to present the chamfered cutting edge 8 when, in the course of the cutting operation, stock is to be removed from a workpiece portion having an irregular surface, the cutting edge 8 being much less subject to shock damage. Present practice would have required considerable reduction in feed if the same cutting edge were used on the interrupted cut or, alternatively, a complete changeover of cutting tool and cutting conditions and thus considerable sacrifice of productivity. The chamfer illustrated in the drawing is a flat surface and forms an angle of about 45° with surface 18 of the insert. This chamfer should preferably form an angle of from 10–45° with the top surface of the insert and, for heavy-duty cutting, should preferably be from 0.03 to 0.08 inch deep.

It will, of course, be understood that whereas the insert shown has three edges of one configuration and one of another configuration, other combinations can be used within the purview of the invention. For example, two edges can be sharply angled and two edges chamfered.

FIG. 2 illustrates the insert of FIG. 1 mounted in a cutting tool 20 and performing a cutting operation on the cylindrical workpiece 22. The workpiece is rotated about its longitudinal axis and fed in the direction of its longitudinal axis toward the tool whereby stock is removed from circumferential portions of the workpiece. The insert is secured within a recess 24 in the tool shank by means of an eccentric pin 26 which extends through the cylindrical opening 28 of the insert. The use of such an eccentric pin for holding an insert is more fully shown in U.S. Patent 3,097,417, assigned to the present assignee. While other holding means may be used, such an eccentric pin enables quick detachment of the insert for indexing the desired cutting edge into cutting position. In the workpiece shown, the circumferential portion from which stock is being removed has recesses 30 therein, and hence the insert is indexed to orient cutting edge 8 in cutting position. After additional feed, when the tool has progressed to the uninterrupted workpiece surface portions 32, the insert would be indexed to orient one of the edges 2, 4 or 6 into cutting position, all for the reasons outlined above.

The chamfered edge may be pressed-in during manufacture by first forming a dense compact of powdered binder and metal carbide, the compact being shaped to provide the final desired edge geometries as described above, and then sintering to form a finished insert embodying the present design. Alternatively, the chamfer may be ground onto an already sintered and shaped insert having conventional positive or negative rake cutting angles.

Whereas the insert shown is provided with the recesses 12 and 14, as described, and is of generally rectangular shape with a total of four cutting edges, other insert shapes may, if desired, be used in the practice of the invention. Hence, it will be understood that while the invention has been described with reference to a preferred embodiment thereof, various changes may be made, all within the full and intended scope of the claims which follow.

What I claim as new and desire to secure by Letters Patent of the United States is:

1. A disposable cutting tool insert comprising a body in the form of a generally rectangular block having oppositely disposed parallel top and bottom surfaces and a plurality of side surfaces therebetween, the meeting of said top and bottom surfaces with said side surfaces forming at least four sharply angled parallel cutting edges, the oppositely disposed top and bottom surfaces having a recessed center portion extending from one end to the other thereof and between two of said cutting edges, at least one but less than all of said cutting edges being chamfered to form a relatively blunt cutting edge, the chamfer forming an angle of from 10–45° with the top surface of the insert.

2. The cutting tool insert of claim 1 wherein said body is cemented carbide.

3. The cutting tool insert of claim 1 in which the chamfer is a flat surface.

References Cited

UNITED STATES PATENTS

| 2,187,512 | 1/1940 | Capps | 29—95 X |
| 3,142,110 | 7/1964 | Hertel | 29—96 |
| 3,188,717 | 6/1965 | Heinlein | 29—96 |

FOREIGN PATENTS

| 87,122 | 1/1922 | Austria. |

OTHER REFERENCES

Article by Mark W. Purser, "Bearing Lands and Negative Rakes Prolong Cutting Tool Life," Aug. 2, 1945 issue of American Machinist Magazine, pp. 119–121.

HARRISON L. HINSON, *Primary Examiner.*